INVENTOR
ODD ANHANGER

United States Patent Office 3,555,592
Patented Jan. 19, 1971

---

3,555,592
MACHINE FOR FORMING AND DISPENSING A PLASTIC MATERIAL
Odd Anhanger, Trelleborg, Sweden, assignor to Square Company Aktiebolag, Malmo, Sweden, a company of Sweden
Filed Apr. 11, 1968, Ser. No. 720,727
Int. Cl. A22c 7/00
U.S. Cl. 17—32                                5 Claims

ABSTRACT OF THE DISCLOSURE

A machine for forming and dispensing a plastic material is provided with a feed screw for feeding material from a container into a cylinder wherein is reciprocable a plunger for dispensing under pressure material fed into the cylinder, the plunger more or less interrupting the communication between the container and the cylinder when dispensing material from the cylinder.

---

Figure 1:
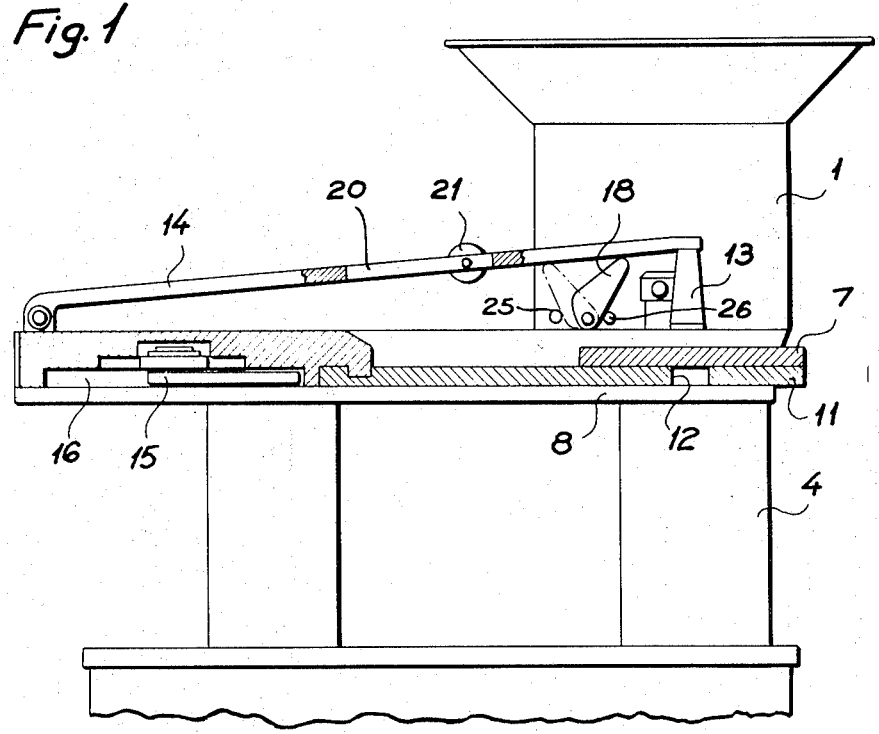

The present invention relates to a machine for forming and dispensing a plastic material and more particularly to a machine for forming meat balls, hamburgers and similar products of minced or chopped meat.

A known type of machine for this purpose comprises a forming plate with at least one through mould aperture and adapted to reciprocate between two end positions, means being provided to force material into the mould aperture from a container in one position of said plate and to dispense from the mould aperture the product formed in the aperture in the other position of said plate. In such a machine, where the forming is done by means of a forming plate, there is provided a compression chamber, which may be considered as part of the container and with which the mould aperture of the plate communicates when the plate is in said one position, in order to positively feed material into the mould aperture. However, in this prior art machine, problems arise on account of the difficulties of achieving a satisfactory feeding of material into the compression chamber from the main part of the container and preventing air from entering such chamber and disturbing the feeding of material into the aperture of the forming plate. Further, air enclosed in the compression chamber may cause smaller explosions therein, which creates problems with regard to the sealing of the machine.

In order to remove these drawbacks a machine of the kind referred to comprises in said container for the material a feed screw, at least one cylinder forming or being connected to said compression chamber, means forming a connection between the interior of said container and the interior of said cylinder at the discharge end of said feed screw, and a plunger reciprocable in said cylinder between two end positions to be displaced in one direction to one end position when the forming plate is in said one position, the feed position, and to interrupt thereby the communication between said container and said cylinder, completely or partly, and positively move material into the aperture of the forming plate, and, when said forming plate is moved to said other position, the discharge position, to be displaced in the other direction to the other end position in order to permit material to be fed into the cylinder from the container.

In a machine of this kind there is achieved a uniform positive feeding of material under high pressure as a result of the interaction between the plunger cylinder assembly and the feed screw, and there is no risk that air will enter and become enclosed in the cylinder and compression chamber. Thus the sealing of the machine is considerably improved.

The pressure applied to the material may be controlled by adjusting said one end position of the plunger in order to vary the through area of the communication between said chamber and said container, afforded with said piston in said one end position.

In a preferred embodiment according to the invention the punch for ejecting the formed product from the aperture of the forming plate is mounted at one end of an arm which is pivoted to said plate at its other end, said arm resting against and being held in a raised position when the forming plate is reciprocated, by a support which is arranged to keep the punch spaced from the aperture of the forming plate and is provided with an opening in order to permit the arm, when the plate is in its position for discharging material from the aperture without being blocked by the support, to swing in order to cause the punch to eject the shaped body from the aperture. When the punch of the machine is arranged in this manner there are no problems about synchronizing the movement of the plate with the ejecting movement of the punch.

Figure 2:
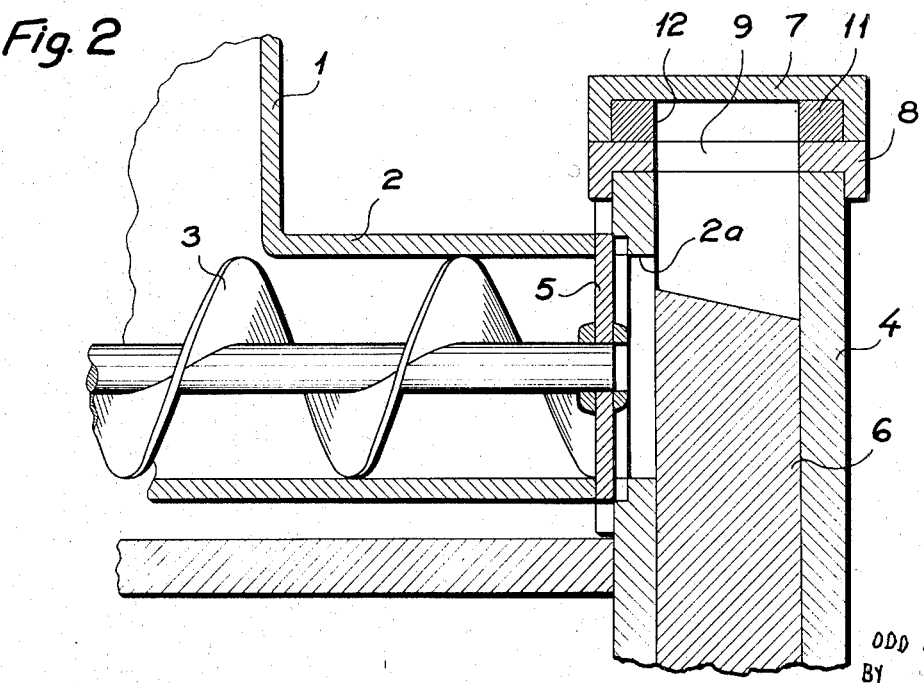

The invention will be described in more detail in the following with reference to the accompanying drawings, in which FIG. 1 is an elevational view, partly in vertical section, of the machine according to the invention, and FIG. 2 is an enlarged vertical sectional view of the main part of the machine shown in FIG. 1.

The forming machine, the main portion of which is shown in FIGS. 1 and 2, comprises a container 1 for receiving the plastic material, e.g., minced or chopped meat, to be formed and dispensed by means of the machine. Container 1 may be charged with material through the upper end thereof and it has a horizontal cylindrical portion 2 receiving the discharge end portion of a feed screw 3 which is mounted at the bottom of the container and connected to an electric motor (not shown) disposed outside container 1. When rotated the feed screw positively displaces material contained in the container through portion 2 into a vertical cylinder 4. The circular bore of the cylinder or tubular member 4 forms a compression chamber and it communicates with portion 2 through an opening 2a at the discharge end of feed screw 3. The discharge end of feed screw 3 is journalled in a cross-arm or spider 5, the opposite end of the screw is journalled in a suitable bearing in the container side wall in any suitable manner (not shown). A plunger 6 is provided in cylinder 4 and it is connected at its lower end to a driving mechanism to reciprocate said plunger in the cylinder. At its upper end, cylinder 4 is connected with a sandwich plate structure comprising a stationary top plate 7 and a stationary bottom plate 8, the latter providing a circular through opening 9 located opposite the cylinder bore and communicating therewith. Opening 9 is circular having substantially the same diameter as the cylinder bore, and is arranged coaxially with the cylinder bore. Between plates 7 and 8 there is guided a forming plate comprising a slide 11 which is provided with a mould aperture 12 having the shape and size to be imparted to the product discharged from the machine. Slide 11 is longitudinally reciprocable horizontally between an inner or first position in which aperture 12 registers with opening 9, and an outer or second position in which aperture 12 is disposed outside plate assembly 7, 8. According to FIG. 1 a punch 13 for the ejection of material contained in the aperture and imparted the cylindrical form thereof is provided at one end of an arm 14 which extends longitudinally of slide 11 and is pivoted to that end of the slide which is opposite to mould aperture 12. Arm 14 and consequently punch 13 will thus move together with slide 11 during the horizontally reciprocating movement thereof, the axis of punch 13 always coinciding with the central axis of mould aperture 12.

Slide 11 is connected to a driving mechanism which may be of the same type as that connected to plunger 6, to be reciprocated between said two end positions. The slide driving mechanism is such that when plunger 6 moves upward slide 11 is in its inner position shown in full lines in the drawing, and when plunger 6 moves downward slide 11 is moved to the outer position. Thus, mould aperture 12 communicates with the cylinder bore via opening 9 when slide 11 is in its inner position shown in full lines, and material may be positively displaced into the mould aperture and compacted therein by means of plunger 6. In the outer position shown in dash and dot lines in FIG. 1, aperture 12 is spaced outwardly from plates 7 and 8.

According to FIG. 1 there is provided a rotatably mounted crank mechanism 15 having a vertical rotational axis and being received by a recess 16 in the lower surface of slide 11 to reciprocate the slide when rotating. Crank mechanism 15 may be connected with a drive motor connected also with the driving mechanism of plunger 6 and comprising an electric motor having speed control and gears, chain transmissions, and other coupling elements necessary in order to bring about the accurate cooperation between the movements of the several machine elements which are necessary in order that the forming machine may operate in a satisfactory manner. When slide 11 is moved from the outer position arm 14 is kept in a raised position by a support 18 mounted indisplaceably on the machine but pivoted to be adjusted between two positions determined by abutment means 25 and 26, punch 13 thereby being located above mould aperture 12. Support 18 slidingly engages the lower side of arm 14. Arm 14 provides a slot-like aperture 20 which is located in such a way that support 18, when slide 11 is in the outer position, is located exactly opposite opening 20 so that arm 14 in this position is no longer held raised by the support but is allowed to swing downward by gravity, whereby punch 13 is allowed to discharge the material contained in mould aperture 12. When the slide is returned from the outer position, support 18 will engage a roller 21 rotatably mounted at the end of opening 20 adjacent to punch 13, said roller 21 engaging support 18 to move it to the position shown in dash and dot lines, and thereafter running on an upwardly-facing surface of support 18 so that arm 14 is raised and punch 13 is moved out of mould aperture 12. Since the movement of punch 13 will be arcuate it is shaped as a truncated cone in order not to get stuck in mould aperture 12.

When the machine operates feed screw 3 rotates continuously in order to positively feed material in the container 1 towards the discharge end of cylindrical portion 2 and, when plunger 6 is in its lower position, to feed material into the cylinder and compression chamber. As described, the vertically reciprocating movement of plunger 6 is synchronized with the movement of slide 11 so that the plunger when moving upward will press material into mould aperture 12 of slide 11. Plunger 6 maintains a certain pressure in the cylinder and compression chamber until slide 11 has been displaced so far from its inner position that the communication between mould aperture 12 and the cylinder bore has been interrupted. When this has taken place plunger 6 moves downward in order to permit additional material to be fed into the cylinder bore by means of feed screw 3, and at the same time slide 11 is moved on to the outer position or discharge position, where punch 13 is displaced downward in order to eject the shaped body from the mould aperture.

The pressure in the cylinder bore and compression chamber may be adjusted by adjusting the upper end position of plunger 6 [for example by varying the length of or exchanging, a connecting rod of a crank drive therefor (not shown)] so that the through area of the communication between cylindrical portion 2 of container 1 is varied.

When slide 11 and punch 13 are arranged as shown in FIG. 1 the movement of the punch for ejecting the material from the mould aperture in the slide is controlled in a simple but exact manner.

The feeding of material into mould aperture 12 of slide 11 may take place from above instead of being performed from below. However, the arrangement shown does not require any transmission between the motor of the machine and punch 13, and there is no problem of coordinating the movements of the punch and slide 11. The machine according to the invention may have a plurality of plunger cylinder assemblies and a corresponding number of mould apertures and punches. When the machine has several mould apertures provided in the slide, which is usually the case, and thus has a corresponding number of punches, all of these are preferably disposed on the same arm.

What I claim and desire to secure by Letters Patent is:

1. A machine for forming and dispensing a plastic material, comprising a container for said material, a cylinder, means forming a connection between the interior of said container and the interior of said cylinder, a feed screw in said container for feeding material from said container to said cylinder through said connecting means, a forming plate providing at least one through mould aperture, means mounting said forming plate for reciprocating movement between first and second positions, said mould aperture being disposed in communication with and opening the interior of said cylinder in said first position and outside said cylinder in said second position, punch means insertable in said mould aperture in said second position, and a plunger reciprocable in said cylinder, said plunger interrupting at least partly the communication between said container and said cylinder and dispensing material into said mould aperture when displaced in one direction with said forming plate to said first position and permitting material to be fed into said cylinder from said container by said feed screw when displaced in the other direction as said forming plate is moved to said second position.

2. A machine as claimed in claim 1 further comprising an arm, means mounting said arm at one end thereof on said forming plate, said punch means being mounted at the other end of said arm, and a support for said arm, slidably engaging said arm on a lower surface thereof to keep said punch means raised over said plate, said arm forming an opening to receive said support therein when said plate is in said second position.

3. A machine as claimed in claim 2 further comprising a roller mounted on said arm in the opening formed thereby to be engaged by said support when said plate is moved from said second position to said first position.

4. A machine for forming compactible material such as chopped meat into a form, comprising a tubular member having a closed end and a side with an opening intermediate the length thereof defining a material inlet and opposed openings aligned adjacent the closed end of said tubular member, a forming plate movable through the opposed openings and having at least one mold aperture extending therethrough which may be positioned in a first filling position of said forming plate with its mold aperture located within said tubular member and adapted to be moved to a second discharge positioned of said forming plate wherein the mold aperture is located out of said tubular member, means mounting said forming plate for movement through the opposed openings of said tubular member between said first and second positions, feed means for feeding the compactible material into said side inlet of said tubular member, and reciprocable plunger means in said cylinder movable past said inlet to force the material already fed to said tubular member ahead of it into said mold receiving aperture when said forming plate is in said first position and movable in an opposite direction past said inlet when said plate is moved to a second position, the mold aperture of said plate being filled by the material in said first position and being located out of said tube for emptying in said second position.

5. A machine, according to claim 4, including ejection means connected to said forming plate for movement therewith and including a punch movable through a mold aperture of said forming plate when said plate is in said second position.

References Cited

UNITED STATES PATENTS

| 1,651,040 | 11/1927 | Reilly | 17—32 |
| 2,413,046 | 12/1946 | Holly | 17—32 |
| 3,203,037 | 8/1965 | Anhanger et al. | 17—32 |
| 3,319,285 | 5/1967 | Holly | 17—32 |

FOREIGN PATENTS

| 467,922 | 6/1937 | Great Britain | 17—32 |

LUCIE H. LAUDENSLAGER, Primary Examiner